United States Patent Office 3,317,502
Patented May 2, 1967

3,317,502
POLYMERIZATION OF OLEFINS IN THE PRESENCE OF A COORDINATION CATALYST AND CARBONYL SULFIDE
Arthur A. Harban and Samuel Renaudo, Bartlesville, Okla., assignors to Phillips Petroleum Company, a corporation of Delaware
No Drawing. Filed Oct. 21, 1963, Ser. No. 317,781
3 Claims. (Cl. 260—93.7)

This invention relates to a method and catalyst system for producing polymers of unsaturated compounds. In one aspect, this invention relates to a method for producing polyolefins at an increased rate by the use of carbonyl sulfide as a catalyst adjuvant. In another aspect, the invention relates to an improved catalyst system for increasing the rate of production of polyolefins by incorporating therein carbonyl sulfide as a catalyst adjuvant. In a further aspect, the invention relates to a method for improving the physical properties of polypropylene by preparing same with a catalyst system having incorporated therein carbonyl sulfide as a catalyst adjuvant. In a still further aspect, this invention relates to a catalyst system for the preparation of polypropylene having improved physical properties imparted thereto.

Mass polymerization of propylene in the presence of a catalyst system comprising diethylaluminum chloride and titanium trichloride has heretofore been disclosed. It is also known that polymerization of propylene with a catalyst system exemplified by the combination of diethylaluminum chloride and the reaction product of titanium tetrachloride and aluminum having the approximate formula $$TiCl_3 \cdot 1/3 AlCl_3$$

is poisoned by such materials as carbon monoxide, hydrogen sulfide, water, oxygen and the like. Sulfur-containing compounds are known poisons for many catalytic reactions and are disclosed as poisons for propylene polymerization in Petroleum Refiner, March 1961, page 128. It is further considered necessary in the art to reduce the sulfur content of the olefin and hydrocarbon diluent streams to less than 10 p.p.m. in order to render them suitable for the production of plastics.

Contrary to these teachings, it has now been found, in accordance with this invention, that small amounts of carbonyl sulfide act as a catalyst adjuvant in the aforementioned catalyst system and result in the production of polypropylene having higher flexural modulus and higher tensile strength.

Accordingly, it is an object of this invention to provide a process wherein polymerization is carried out at an increased rate and in a manner providing improved properties to the resulting polymer. Another object of the invention is to provide a novel catalyst system wherein the polymerization process is conducted in a manner which imparts improved properties to the resulting polymers.

Other objects, aspects and the several advantages of the invention will be readily apparent to those skilled in the art from a study of the following disclosure and the appended claims.

We have now discovered that small amounts of carbonyl sulfide, when combined with the catalyst or with the feed stream in an amount ranging from 10 to 80 parts per million based on the total monomer feed, impart improved physical properties to the resulting polymer. It was highly unexpected that the intentional corporation of the particular compound of the present invention into the reaction system within the ranges herein set forth would result in the improvement in physical properties of the resulting polymer, thereby serving as a catalyst adjuvant in the system rather than as a poison.

The invention is broadly applicable to the polymerization of olefins corresponding to the formula $R—CH=CH_2$, wherein R is selected from the group consisting of hydrogen and alkyl radicals containing from 1 to 4, inclusive, carbon atoms. Preferred olefins polymerized by the method of this invention include propylene, 1-butene, 1-pentene, 4-methyl-1-pentene, and the like.

The polymerization process of the invention is conducted in the presence of the well-known coordination catalyst system comprising two or more components, wherein one component is an organometal compound, including compounds wherein one or more, but not all, organo groups are replaced by halogen, a metal hydride, or a metal of Group I, II or III, and the second component is a Group IV, V, VI or VII (Mendeleef's Periodic System) metal compound. The organometal compounds referred to include, without limitation, alkyl, cycloalkyl or aryl compounds of the mono-, di-, or trivalent metals, particularly aluminum, gallium, indium, beryllium, sodium, potassium, lithium, rubidium, cesium, magnesium, cadmium, mercury, zinc, barium, or such organometal componuds wherein one or more but not all of the alkyl, cycloalkyl or aryl groups is replaced by a hydrogen atom and/or a halogen atom. The organo groups can be quite large, compounds being applicable which have 15 or more carbon atoms in each alkyl, cycloalkyl or aryl group and 40 carbon atoms or more in the molecule. Specific examples of such organometal compounds include trimethylaluminum, triethylaluminum, triisobutylaluminum, a mixture of diethylaluminum chloride and ethylaluminum dichloride (sometimes referred to as ethylaluminum sesquichloride), diethylaluminum hydride, ethylaluminum hydride, ethylaluminum dichloride, diethylaluminum chloride, trioctylaluminum, tridodecylaluminum, triphenylaluminum, triphenylgallium, diphenylberyllium, dicyclohexylberyllium, cyclohexylzinc fluoride, $CH_3AlCl_2$, $(CH_3)AlCl_2$, $(CH_3)_2AlCl$, $(C_4H_9)_2AlBr$, $C_8H_{17}AlI_2$
$(C_3H_7)_2GaF$, $(C_6H_{11})_2GaCl$ (cyclohexane derivative, $C_6H_5GaBr_2$, $C_{20}H_{41}GaBr_2$, $(C_{14}H_{29})_2GaF$, $(C_6H_5)_2InCl$, $C_8H_{17}InF_2$, $C_6H_{11}InBr_2$ (cyclohexane derivative), $C_{17}H_{35}BeI$, $CH_3BeBr$, and the like.

The metal hydrides can include, as specific examples, aluminum hydride, lithium aluminum hydride, barium hydride, gallium hydride, indium hydride, sodium aluminum hydride, and potassium beryllium hydride.

The metals of Groups I, II and III are applicable as a class, the most important members being sodium, magnesium and aluminum.

The compounds of the metals Groups IV, V, VI and VIII of the Periodic System include the oxides, hydrides, halides, oxyhalides and salts of organic acids, usually having 20 or less carbon atoms, such as formic acid, caprylic acid, lauric acid, palmitic acid, and arachidic acid. It is usually preferred to employ compounds of titanium, zirconium, hafnium, chromium, thorium, molybdenum, vanadium, niobium, tantalum and iridium. Of the various compounds, it is generally preferred to employ the titanium halides, including the chlorides, fluorides, bromides and iodides, particularly the tri- and tetrachlorides, the tri- and tetrabromides, and the tri- and tetraiodides of titanium.

A third catalyst component which can be advantageously used is an organic halide or metal halide where the organic radical has 30 or less carbon atoms and is an alkyl, cycloalkyl or aryl group. Specific examples include ethyl bromide, ethyl trichloro titanium, bromobenzene, cyclohexyl chloride, and the like. Also applicable as third catalyst components are the alkali metal and ammonium halides and aluminum halides (where the catalyst also includes another metal compound such as titanium compound), a halogen, a hydrogen halide, an organo-phosphorus-containing compound, and a peroxide.

The invention is particularly advantageous when the carbonyl sulfide is employed in conjuction with an initiator system comprising an alkyl aluminum and a titanium trihalide, for example a trialkylaluminum or a dialkylaluminum halide plus a titanium halide such as titanium trichloride.

The preferred initiator system particularly in the mass polymerization of propylene comprises a dialkylaluminum halide, more preferably a dialkylaluminum chloride, e.g. diethylaluminum chloride and the reaction product of titanium tetrachloride and aluminum having the approximate formula $TiCl_3 \cdot 1/3AlCl_3$.

The ratio of the catalyst components employed in the present process can be varied rather widely depending upon the particular monomer employed and the operation conditions. The mol ratio of the organometal compound, metal hydride or Group I, II or II metal to the Group IV, V, VI or VIII metal compound is usually in the range of 1:1 and 10:1 with a preferred range of 2:1 and 5:1. The concentration of catalyst in the polymerization zone is usually in the range of 0.01 to 5 weight percent based on the monomer charged to that zone, although lesser or greater amounts can be employed.

The amount of the carbonyl sulfide compound employed is in the range of between about 10 and about 80 parts per million based upon the monomer feed. Conventionally, the carbonyl sulfide is charged to the polymerization zone along with the monomer feed.

The polymerization of the 1-olefin with the catalyst and adjuvant of the invention can be conducted by any suitable means such as by a solution process or the mass procedure, and under conditions well known to those skilled in the art. As is known to those skilled in the art, polymerization of the alpha-olefins can be conducted in the presence of a hydrocarbon diluent which is inert and liquid under the conditions of the process and does not have a deleterious effect on the catalyst. Suitable diluents include paraffinic, cycloparaffinic and/or aromatic hydrocarbons. Examples of such diluents include propane, butane, pentane, hexane, cyclohexane, methylcyclohexane, benzene, toluene, the xylenes, and the like. The relative amounts of diluent and olefin employed in the polymerization depend upon the particular conditions or techniques used and are generally governed by the capacity of the apparatus to effect suitable agitation and heat removal. The polymerization can be conducted at a temperature varying over a rather broad range, for example at a temperature of $-100°$ to $500°$ F. In general, pressures are satisfactory which are sufficient to maintain the reaction mixture substantially in the liquid phase.

Although the invention is not to be limited thereto, one particularly preferred method is the so-called mass polymerization system wherein the monomer, preferably the propylene, is liquefied and contacted in the reaction zone with a two- or more component initiator system discussed hereinbefore, preferably in the presence of hydrogen. When employing propylene as the monomer and diluent, a suitable temperature is in the range of about 0 to $250°$ F.

The inventive process can be carried out as a batch process, e.g. by pressuring the olefin to be polymerized into a reactor containing a catalyst system, the adjuvant and the diluent. Furthermore, the process can be conducted continuously by maintaining the reactants in the reactor for a suitable residence time. The residence time employed in the continuous process can vary widely since it depends to a great extent upon the temperature and the specific olefin. However, the residence time in a continuous process generally falls within the range of 1 second to 5 hours or more. In a batch process, the reaction time can also vary widely, such as from 15 minutes to 24 hours or more.

It has been found that various materials in some instances may have a tendency to inactivate the catalyst composition of this invention. These materials include carbon dioxide, oxygen and water. Accordingly, it usually is desriable to free the olefins to be polymerized from these materials as well as from other materials which may tend to inactivate the catalyst before contacting the olefin with the catalyst. Any of the known means for removing such contaminants can be employed. Furthermore, the hydrocarbon diluent employed in the process preferably is freed of contaminants such as water, oxygen and the like. It is also desirable that air and moisture be removed from the reaction vessel before the reaction is carried out. This is usually accomplished by purging the vessel with an inert gas such as nitrogen. In some cases, small amounts of catalyst inactivating materials, such as oxygen and water, can be tolerated in the reaction mixture while still obtaining reasonably good polymerization rates. However, it is to be understood that the amount of such materials present in the reaction mixture shall not be sufficient to completely inactivate the catalyst.

The treatment of the polymerizate subsequent to the polymerization step depends upon the type process employed for the polymerizaiton. For example, in a solution process upon completion of the polymerization, by one suitable method any excess olefin is vented and the contents of the reactor are treated so as to inactivate the catalyst and remove the catalyst residue. The polymer is then precipitated and separated from the diluent by decantation, filtration, or other suitable method, after which the polymer is dried.

The following example will further illustrate the invention.

*Example*

Propylene was polymerized in liquid phase for two hours at a temperature of $120°$ F. and a pressure of 400 p.s.i.g. in the presence of 333 p.p.m. (based on the propylene) of diethylaluminum chloride and 283 p.p.m. of the reaction product of titanium tetrachloride and aluminum having the approximate formula $TiCl_3 \cdot 1/3AlCl_3$, together with different amounts of carbonyl sulfide. At the end of the polymerization runs, excess propylene was vented and the polymers allowed to stand in contact with methanol for 24 hours for catalyst deactivation and washing. After filtration, the polymers were sprayed with an acetone solution of 4,4'-thiobis(6-tert-butyl-m-cresol) and dilaurylthiodipropionate and were dried in vacuo at a temperaturer of $150°$ F. for 24 hours. The amount of carbonyl sulfide used in the various runs and the properties of the polymers obtained are included in the following table:

| Run No. | Carbonyl Sulfide, p.p.m.[1] | Productivity, gm. polymer/gm. $TiCl_3.1/3AlCl_3$ | Flexural Modulus $\times 10^{-3}$, p.s.i.[2] | Tensile Strength, p.s.i.[3] |
|---|---|---|---|---|
| 1[4] | 0 | 452±46 | 232±10 | 4,806±154 |
| 2 | 11 | 496 | 271 | 5,096 |
| 3 | 22 | 469 | 270 | 5,150 |
| 4 | 44 | 474 | 250 | 5,012 |
| 5 | 80 | 506 | 241 | 5,096 |

[1] Based on propylene charged.
[2] Determined at $73°$ F. by ASTM D 790-61 and adjusted to a melt index of 1.0 and an amorphous polymer content of 0.0. Melt index was determined by ASTM D 1238-57T, Condition E. Amorphous polymer content was determined by measuring the amount of polymer soluble in n-pentane during a 24-hour contacting period at room temperature. Curves for making these adjustments are based on many runs in which polymers having different melt indices and amorphous contents were produced. Flexural modulus and tensile strength were plotted versus melt index and amorphous content, respectively, and extrapolated to 1.0 and 0.0, respectively.
[3] Determined at $73°$ F. by ASTM D 638-61T and adjusted to a melt index of 1.0 and an amorphous polymer content of 0.0 (see footnote 2).
[4] Average of 9 control runs. The limits shown are for the 95% confidence level, i.e., 95 percent of all such subsequent runs would be expected to produce polymers having properties within the limits shown.

A consideration of the properties of polymers made in the presence of carbonyl sulfide as compared with the 95 percent confidence level property limits for polymers made in the absence of carbonyl sulfide demonstrates that both flexural modulus and tensile strength were increased by the presence of carbonyl sulfide as a catalyst adjuvant.

Various modifications are possible in view of the foregoing disclosure, without departing from the spirit or scope thereof.

We claim:

1. A process for the production of a normally solid polymer of a 1-olefin having a low amorphous content comprising contacting under polymerization conditions a 1-olefin having the formula R—CH=CH$_2$ wherein R is an alkyl group having from 1 to 4, inclusive, carbon atoms with a catalyst prepared by admixing at least two essential components, one of said components being (1) selected from the group consisting of organometal compounds, metal hydrides and metals of Group I, II and III and another of said components being (2) a metal compound selected from the group consisting of Groups IV, V, VI and VIII metal compounds, the mole ratio of said organometal compounds, metal hydrides and metals of Group I, II and III to said metal compound selected from the group consisting of Group IV, V, VI and VIII metal compounds is in the range of 1:1 to 10:1 wherein said catalyst is present in the range of 0.01 to 5 weight percent based on the amount of 1-olefin contacted and wherein carbonyl sulfide is present in an amount in the range of from 11 to 80 parts per million based on the amount of 1-olefin feed.

2. A process according to claim 1 wherein said contacting is carried out at a temperature in the range of 0 to 250° F. and at a pressure sufficient to maintain said 1-olefin monomer in the liquid phase and recovering the solid polymer thus produced as a product of the process.

3. A process according to claim 1 wherein said 1-olefin is propylene and said catalyst is formed by commingly diethylaluminum chloride and the reaction product of titanium tetrachloride and aluminum, having the approximate formula TiCl$_3 \cdot$ 1/3AlCl$_3$.

References Cited by the Examiner

UNITED STATES PATENTS 3,032,510   5/1962   Tornqvist _____ 260—93.7

FOREIGN PATENTS 1,231,089   9/1960   France.

OTHER REFERENCES

Vesley: Journal of Polymer Science, 55, 25–32 (1961), QD 281 P6J6.

JOSEPH L. SCHOFER, *Primary Examiner.*

M. B. KURTZMAN, *Assistant Examiner.*